United States Patent [19]

McClure

[11] Patent Number: 4,935,719

[45] Date of Patent: Jun. 19, 1990

[54] COMPARATOR CIRCUITRY

[75] Inventor: David C. McClure, Carrollton, Tex.

[73] Assignee: SGS-Thomson Microelectronics, Inc., Carrollton, Tex.

[21] Appl. No.: 332,288

[22] Filed: Mar. 31, 1989

[51] Int. Cl.$^5$ .............................................. G06F 7/02
[52] U.S. Cl. .................................... 340/146.2; 364/769
[58] Field of Search .............................. 364/769, 900; 340/146.2

[56]  References Cited

U.S. PATENT DOCUMENTS

| | | | |
|---|---|---|---|
| 3,241,114 | 3/1966 | Zieper et al. | 340/146.2 |
| 3,576,531 | 4/1971 | Scott | 340/146.2 |
| 4,648,059 | 3/1987 | Gregorcyk | 364/769 |
| 4,761,759 | 8/1988 | Nakagawa | 364/769 |

Primary Examiner—Gary V. Harkcom
Assistant Examiner—Tan V. Mai
Attorney, Agent, or Firm—Robert D. Lott; Kenneth C. Hill; Richard K. Robinson

[57]  ABSTRACT

Two sets of binary data of N bits in length are compared by first forming the exclusive OR function of each of the corresponding bits of the two data sets. The output of each of the exclusive OR gates controls two sets of transmission gates in each of N comparator circuits which are combined in series. If an individual pair of bits are the same, then the comparator circuit transfers the data from its compare input to its compare output, and if the individual bits are different, the respective compare circuit transfers the data from the respective bit on one of the buses to the compare output of the circuit. The compare input of the first compare circuit is connected to ground and the compare input of the rest of the comparator circuits is connected to the compare output of the previous circuit and the compare output of the Nth compare circuit forms a signal indicative of whether the data on the first bus is greater than the data on the second bus.

7 Claims, 9 Drawing Sheets

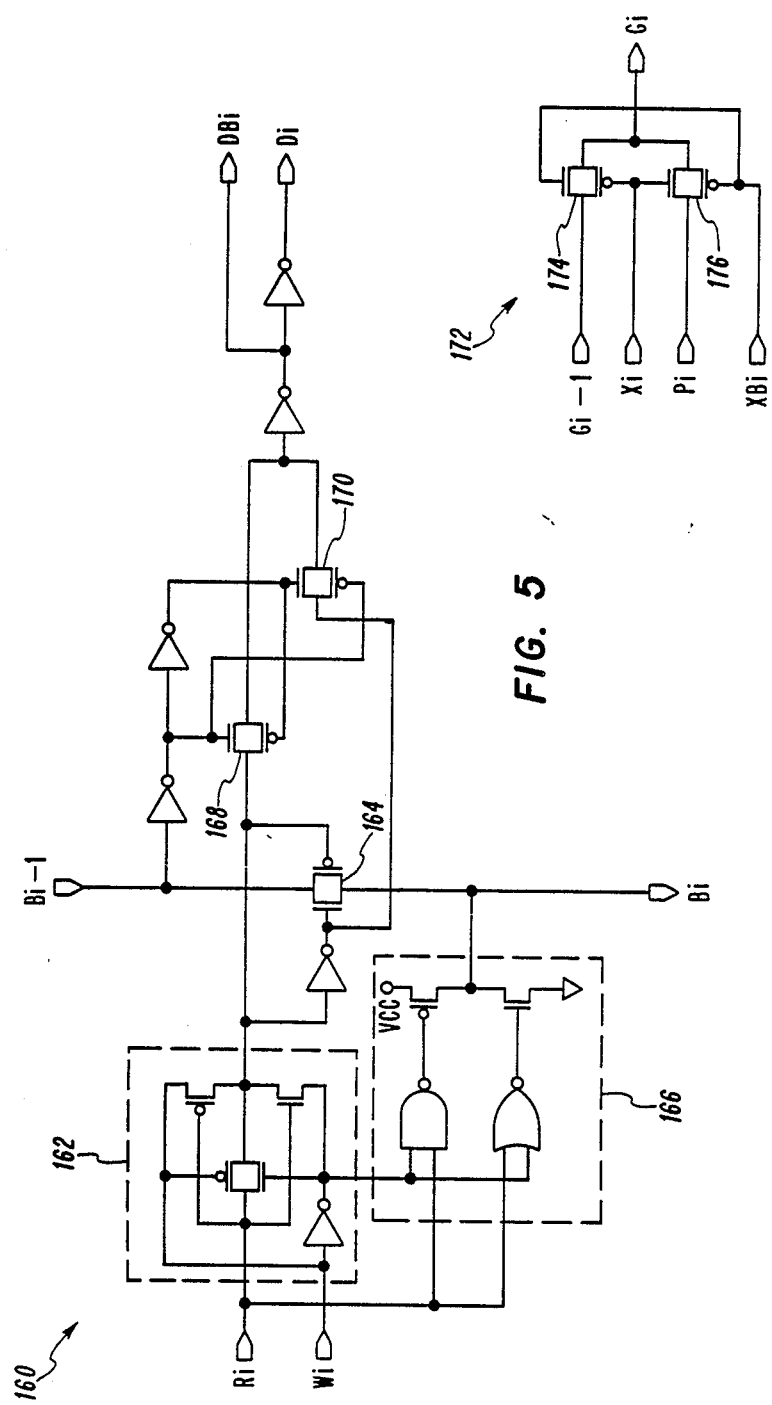

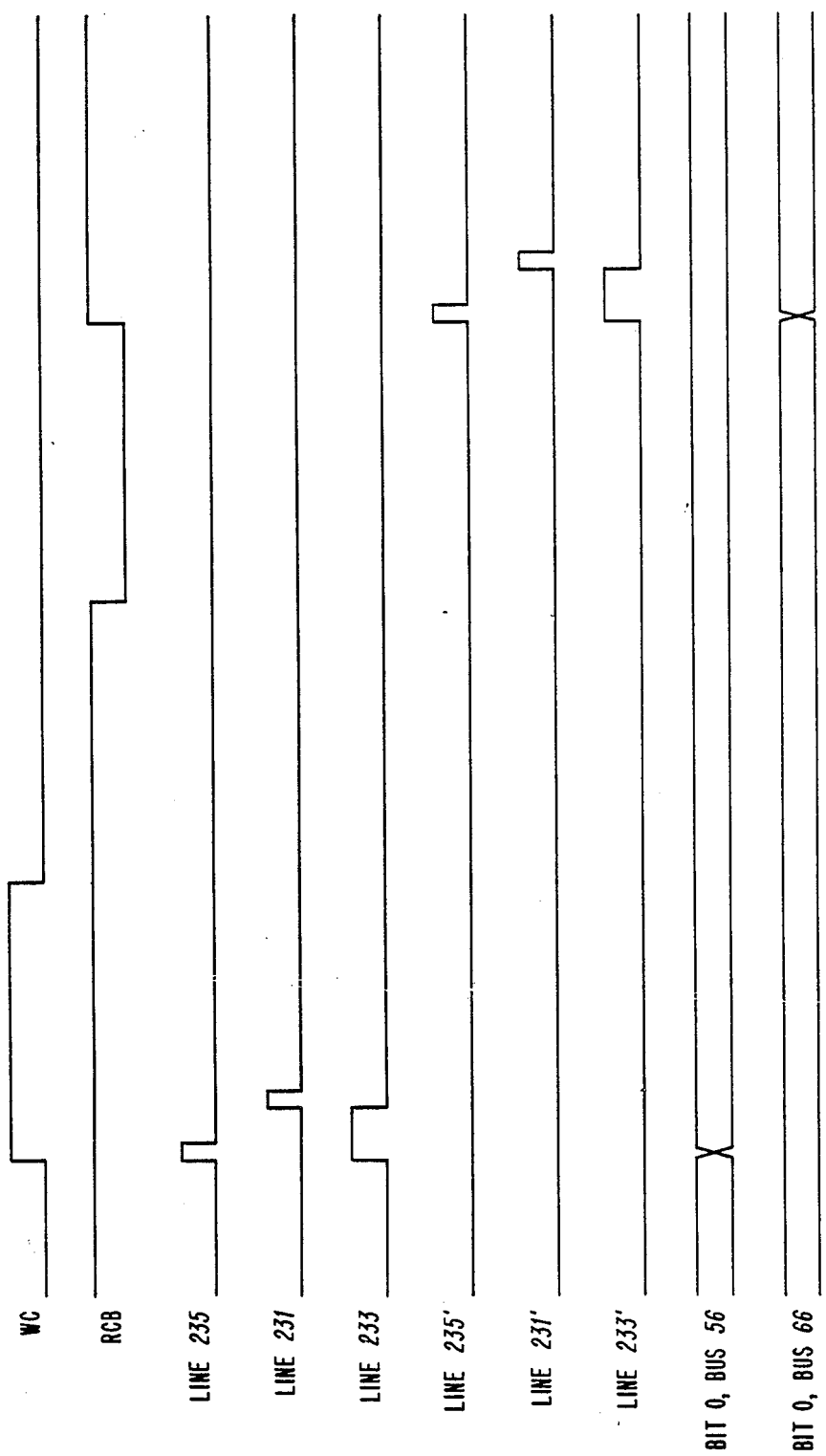

COMPARATOR CIRCUITRY

REFERENCE TO RELATED APPLICATION

Reference is made to a related application entitled CIRCUITRY AND METHOD FOR PROVIDING AN OUTPUT SIGNAL INDICATIVE OF THE TIME DELAY BETWEEN TWO ASYNCHRONOUS CLOCK SIGNALS, Ser. No. 332,289, filed Mar. 31, 1989, in the name of McClure, David and Lysinger, Mark. This application discloses and claims a FIFO flag generation circuit which, in the preferred embodiment, uses a comparator circuit according to the present invention.

TECHNICAL FIELD OF THE INVENTION

The present invention pertains to digital electronic circuits, and more particularly, to digital comparator circuits.

BACKGROUND OF THE INVENTION

The comparison of two digital numbers in binary format often occurs in digital circuits. For example, in the flag generation circuitry of a first-in first-out (FIFO) memory device described in the above-referenced application, the difference between the write clock pulse counter and a read clock pulse counter is compared to a predetermined number to determine the status of the FIFO.

While in many general purpose computers the comparator circuit is integral with the arithmetic logic unit, in other circuits, such as the comparator circuit described in the preceding paragraph, the comparator circuit performs a single function and, therefore, it is desirable to have a comparator circuit which utilizes a minimum amount of chip area and power supply current.

SUMMARY OF THE INVENTION

It is, therefore, an object of the present invention to provide a comparator circuit which utilizes a minimum amount of chip area and which requires a minimum amount of power supply current.

Shown in an illustrated embodiment of the invention is circuitry for detecting if the difference between two numbers represented as logic levels on first and second data buses is less than or greater than a preset value. This circuitry includes a subtractor chain and a comparator chain. The subtractor chain has a plurality of serially connected subtractor circuits with a first subtractor circuit at one end of the subtractor chain and an Nth subtractor circuit at the other end of the subtractor chain. Each of the subtractor circuits has a difference output terminal and a borrow output terminal, first and second input terminals coupled to one signal line on each of the first and second data buses respectively, and a borrow input terminal. The borrow input terminal is coupled to a first reference voltage in the first subtractor circuit and the borrow input terminals of the rest of the subtractor circuits are coupled to the borrow output terminal of the preceding subtractor circuit in the chain. The subtractor circuits also include circuitry which determines the arithmetic difference between the signal from the first bus and the second bus combined with the borrow input signal, and which produces the difference output signal and the borrow output signal.

The comparator chain has a like plurality of serially connected comparator circuits with a first comparator circuit at one end of the comparator chain and an Nth comparator circuit at the other end of the comparator chain. Each of the comparator circuits has an output terminal, a preset bit input terminal coupled to one bit of the preset value, a difference input terminal coupled to the difference output of a corresponding subtractor circuit of the subtractor chain, and a compare input, the compare input of the first comparison circuit being coupled to a second reference voltage and the compare inputs of the remainder of the comparison circuits being coupled to the output terminal of the previous compare circuits. The comparison circuits include circuitry which couples the preset value input to the output terminal when the difference input is at a first logic state and which couples the compare input to the output terminal when the difference input is at a second logic state. The output terminal of the Nth comparison circuit forms an output indicative of whether the difference between the two numbers on the first and second data buses is greater than the preset value.

Also shown in an illustrated embodiment of the invention is circuitry for detecting if a first data set A is greater than a second data set B, both the A data set and B data set being of N bits in length. The comparator includes N exclusive OR gates in which each of the exclusive OR gates has as inputs a data bit from the A data set and a corresponding data bit from the B data set, and has an exclusive OR output. The comparator also includes a comparator chain having N comparator circuits in a series arrangement with a first comparator circuit at one end of the comparator chain and an Nth comparator circuit at the other end of the comparator chain. Each of the comparator circuits includes an output terminal, an A bit input coupled to one of the bits of the A or B data set, an exclusive OR input coupled to one of the exclusive OR outputs, and a compare input with the compare input of the first comparator coupled to a reference voltage and the compare inputs of the remainder of the comparator circuits being coupled to the output terminal of the previous comparator circuit. Each of the comparator circuits also includes circuitry which couples the A bit input to the output terminal when the exclusive OR input is at a first logic state, and which couples the compare input to the output terminal when the exclusive OR input is at a second logic state, wherein the output terminal of the Nth comparator circuit forms an output indicative of whether the data set A is greater than the data set B.

BRIEF DESCRIPTION OF THE DRAWINGS

The aforementioned and other features, characteristics, advantages, and the invention in general, will be better understood from the following, more detailed description taken in conjunction with the accompanying drawings in which:

FIG. 5 is a logic diagram of a subtractor circuit of a subtractor block shown in FIG. 2;

FIG. 6 is a circuit diagram of a comparator circuit of a comparator block shown in FIG. 2;

FIG. 9 is a timing diagram of certain signals occurring in FIG. 2 and FIG. 8.

Figure 1:
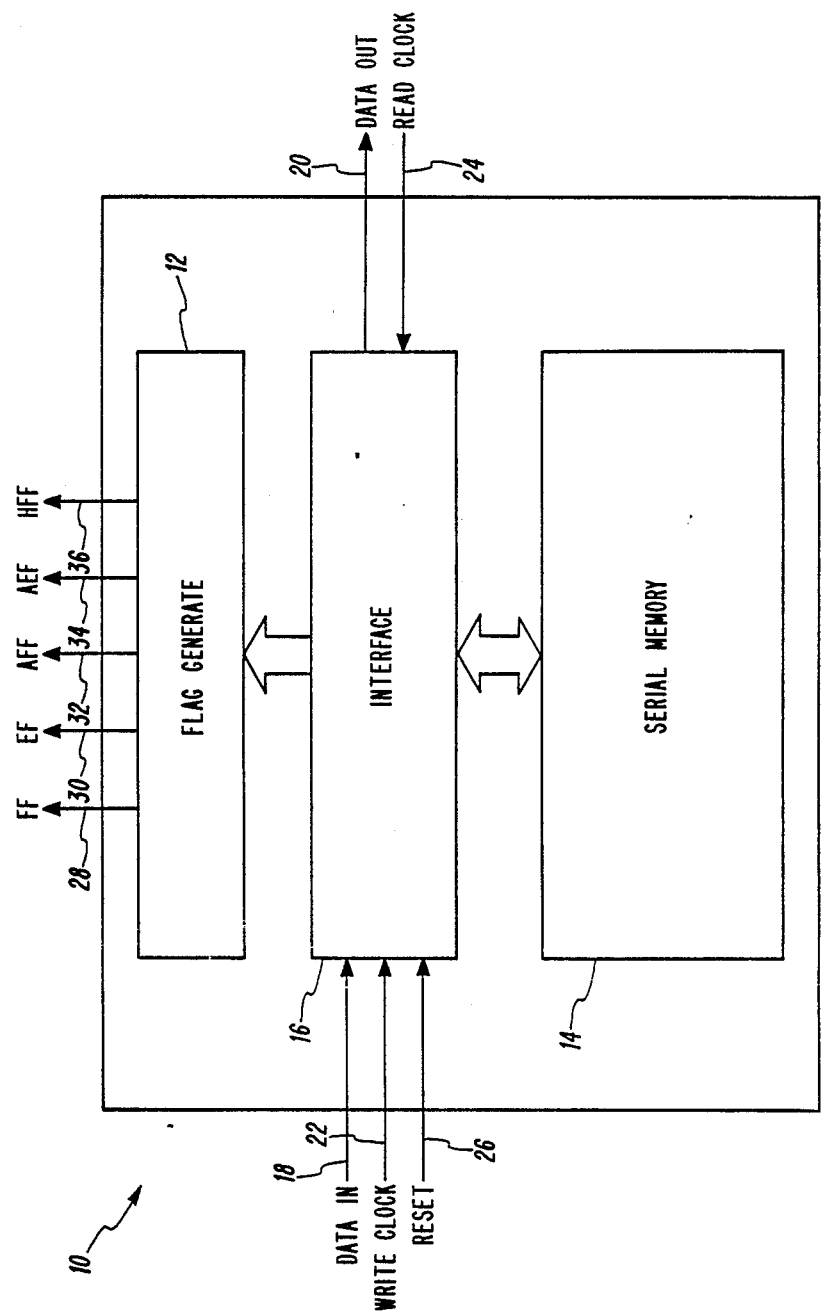
FIG. 1 is a block diagram of a FIFO memory which includes a flag generation circuit.

It will be appreciated that for purposes of clarity and where deemed appropriate, reference numerals have been repeated in the figures to indicate corresponding features, and that the timing signals shown in FIG. 9 have not necessarily been drawn to scale in order to more clearly show timing relationships in the preferred embodiment of the invention.

DESCRIPTION OF THE PREFERRED EMBODIMENT

The circuitry for providing an output signal indicative of the time delay between two asynchronous clock signals according to the preferred embodiment of the present invention is embodied in a flag generation circuit in a FIFO memory and includes two counters, a write counter and a read counter, a subtractor, a comparator, and a deglitch circuit. The flag generation circuit operates by counting the number of write clock signal and read clock signals and subtracting these two counts to form a difference signal. This difference signal is then compared in the comparator to a predetermined number and an unfiltered flag signal indicates the results of this comparison. The deglitch circuit operates to latch the output signal whenever the appropriate edge of either the write clock or the read clock is received and to keep the output signal from changing until the result of the received write clock or read clock signal has propagated through the counter, subtractor, and comparator. After this blanking time, the output of the unfiltered flag signal is then passed to the flag output signal.

Turning now to the drawings, FIG. 1 is a block diagram of a FIFO memory 10 which includes circuitry 12 for generating the status flags for the FIFO 10. The FIFO 10 also includes a serial memory array 14 and logic circuitry 16 for providing interface circuitry between the various blocks of the FIFO 10.

As shown in FIG. 1, the FIFO 10 has a plurality of external terminals including a DATA IN terminal 18, a DATA OUT terminal 20, a WRITE CLOCK terminal 22, a READ CLOCK terminal 24, and a RESET terminal 26. The FIFO 10 also has a plurality of status flag signals including the full flag signal, FF, on terminal 28, and empty flag signal, EF, on terminal 30, an almost full flag signal, AFF, on terminal 32, an almost empty flag signal, AEF, on terminal 34, and a half full flag signal, HFF, on terminal 36.

The FIFO 10 operates by first being reset by a RESET signal on terminal 26 which resets the read pointer and the write pointer to the first memory cell in the serial memory array 14. At this point the empty flag signal on terminal 30 indicates that the FIFO 10 is empty and the almost empty flag signal on terminal 34 also indicates that the FIFO 10 is in the almost empty state, which in the preferred embodiment means that there are fewer than 8 memory cells between the write pointer and the read pointer that have been written into as their last operation. After the receipt of the first write clock signal on terminal 22, the empty flag signal on terminal 30 will cease to indicate an empty FIFO 10, but the almost empty signal on terminal 34 will continue to indicate an almost empty condition. After there are 8 more write clock signals than the number of read clock signals, then the almost empty flag signal on terminal 34 will cease to indicate an almost empty condition. When the FIFO becomes half full, the half full flag signal on terminal 36 will indicate a half full status; and when the number of memory cells between the read pointer and the write pointer is eight less than the maximum memory space, then the almost full flag signal on terminal 34 will indicate an almost full condition and the half full flag signal on terminal 36 will continue to indicate a half full condition. When the write pointer is pointing at the same cell as the read pointer such that all of the memory cells have been written into as their last operation, then the full flag signal on terminal 28 will indicate that the FIFO 16 is full of data, the almost full flag signal on terminal 34 will also indicate an almost full condition, and the half full flag signal on terminal 36 will also indicate a half full condition.

Figure 2:
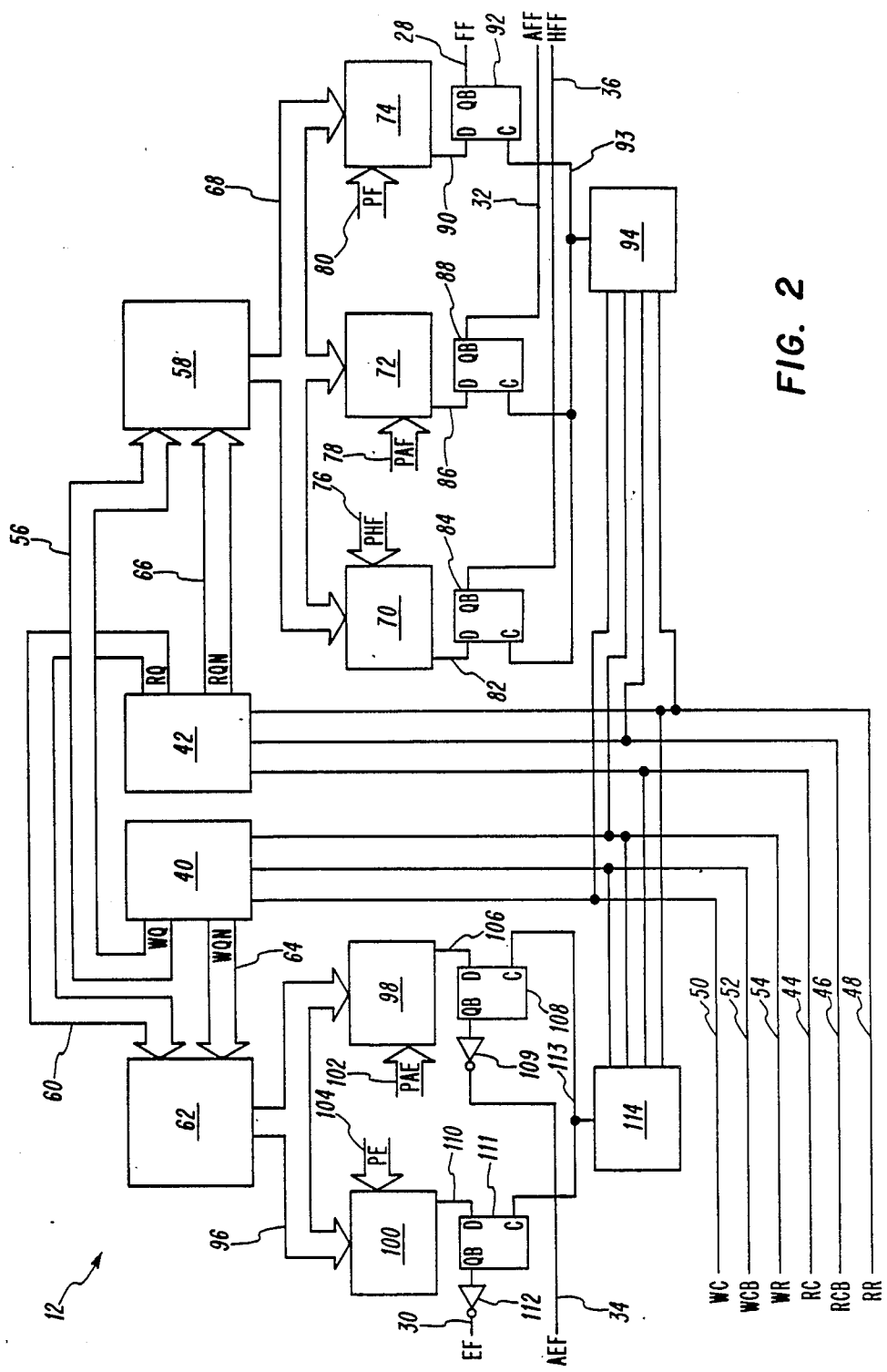
FIG. 2 is a block diagram of the flag generation circuit of the FIFO memory shown in FIG. 1.

FIG. 2 depicts a block diagram of the flag generation circuitry 12. The flag generation circuitry 12 includes a write counter block 40 and a read counter block 42. The read counter block 42 receives the read clock, shown as RC, on line 44 and the read clock bar signal, shown as RCB, on line 46. The read counter 42 also receives a reset signal, shown as RR on line 48. Similarly, the write counter 42 receives a write clock signal, shown as WC, on line 50, a write clock bar signal, shown as WCB, on line 52, and a write reset signal, shown as WR, on line 54.

Both the read counter block 42 and the write counter block 40 provide two sets of Q outputs, a first set, RQ and WQ, which changes on the initial edge of the clock pulse, and a second set, RQN and WQN, which changes on the trailing edge of the clock pulse. Thus, as shown in FIG. 2, the write counter block 40 has a WQ bus 56 containing the outputs of the write counter 40 which change on the initial edge of the clock pulse. The WQ bus 56 is input into a first subtractor block 58. A second output bus of the write counter block 40 is the WQN bus 64 which provides the outputs of the write counter 40 which change on the trailing edge of the write clock. The WQN bus 64 is input to a second subtractor block 62. In a similar manner, the read counter block 42 has a RQ output bus 60 which is input to the subtractor block 62, and an RQN output bus 66 which is input to the subtractor block 58.

The subtractor block 58 subtracts the value on the RQN bus 66 from the WQ bus 56 and provides a difference output on a difference bus 68. The difference bus 68 is input into three comparator blocks, a half full comparator block 70, an almost full comparator block 72, and a full comparator block 74. The half full comparator block 70 has shown, for purposes of description, a program value bus input 76 shown as PHF. Similarly, the almost full comparator block 72 has a program value bus input 78, shown as PAF, and the full comparator block 74 has a program value bus input 80, shown as PF. In the preferred embodiment, the program values PHF, PAF, and PF are encoded into the metalization layers of the FIFO memory 10 integrated circuit. The output of the half full comparator block 70 is placed on line 82 which is connected to the D input of a latch 84. The output of the latch 84 forms the half full flag signal on terminal 36. The output of the almost full comparator block 72 is placed on a line 86 which is connected to the D input of another latch circuit 88, the output of which forms the almost full flag signal on terminal 32. The output of the full comparator block 74 is placed on line 90 which in turn is connected to the D input of a latch circuit 92, the output of which forms the full flag signal on terminal 28.

Clock inputs of the latches 84, 88, and 92 are connected together on a line 93 and to the output of a deglitch circuit 94. The deglitch circuit 94 has as inputs the write clock signal on line 50, the read clock bar signal on line 46, and the two reset signals, write reset on line 54 and read reset on line 48.

The subtractor block 62 subtracts the count on the RQ bus 60 from the count on the WQN bus 64 and provides a difference signal on a difference bus 96. The difference bus 96 is connected to the input of an almost empty comparator block 98 and an empty comparator block 100. The almost empty comparator block 98 has a second input of a program value which, for purposes of description, is shown as a data bus 102 labeled PAE. Similarly, the empty comparator block 100 has a second input of a program value on a data bus 104 shown as PE. In the preferred embodiment, the program values PAE and PE are encoded into the metalization layers of the FIFO memory 10 integrated circuit. The output of the almost empty comparator block 98 is connected on a line 106 to the D input of a latch 108, the output of which is inverted by an inverter 109 to form the almost empty flag signal on terminal 34. The output of the empty comparator block 100 is placed on a line 110 which is connected to the D input of a latch 111, the output of which is inverted by an inverter 112 to form the empty flag signal on terminal 30. Clock inputs of the latches 108 and 111 are connected together on a line 113 and to the output of a second deglitch circuit 114. This deglitch circuit 114 has as inputs the read clock signal on line 44, the write clock bar signal on line 52, and the two reset signals, write reset on line 54 and read reset on line 48.

In operation the flag generation circuit 12 shown in FIG. 2 utilizes the write counter block 40 and the read counter block 42 to count the number of write clock pulses and read clock pulses respectively after these counters have been reset by the respective reset commands on lines 54 and 48. In the preferred embodiment, the FIFO memory 10 has 2048 storage cells requiring 11 data bits to specify the location of the write pointer or the read pointer. The counter blocks 40 and 42, the subtractor blocks 58 and 62, and the comparator blocks 70, 72, 74, 98, and 100 are 12 bits wide, the 12th bit being used to distinguish an empty FIFO condition from a full FIFO condition. In normal operation both the write counter 40 and the read counter 42 are reset at the same time, but, as will be understood by those skilled in the art, the write counter 40 or the read counter 42 are separately reset at times when it is desired to rewrite information into some of the memory cells or to reread information from some of the memory cells.

The subtractor block 58 is used in the generation of the half full, almost full, and full flags at output terminals 36, 32, and 28 respectively. The subtractor block 58 receives the 12 bit count data on the WQ bus 56 from the write counter block 40, which data changes on the leading edge of the write clock signal, and receives the 12 bit count data from the read counter block 42 on the RQN bus 66, which count changes on the trailing edge of the read clock signal. These specific clock edges are used in the preferred embodiment to insure that the flag generation circuitry, in combination with the read and write control circuitry, do not cause the same memory cells to be written into or read from at the same time. The subtractor block 58 subtracts the read count on bus 66 from the write count on bus 56 and provides a difference on the difference bus 68. The half full comparator block 70, the almost full comparator block 72, and the full comparator block 74 compare this difference on bus 68 with a set of predetermined numbers, specifically the predetermined half full program value on bus 76, the predetermined almost full program value on bus 78, and the predetermined full program value on bus 80. The comparator blocks 70, 72, and 74 provide a logic 1 level on their outputs when the number on the difference bus 68 is less than the program value on the buses 76, 78, and 80.

In a similar manner, the subtractor block 62 subtracts the 12 bit count data on the RQ bus 60, which data changes on the leading edge of the read clock, from the 12 bit count data on the WQN bus 64, which number changes on the trailing edge of the write clock, to form the difference on the difference bus 96. The number in the difference bus 96 is compared to the PAE program value on bus 102 in the almost empty comparator block 98 and to the PE program value on bus 104 in the empty comparator block 100. The comparator blocks 98 and 100 operate in the same manner as the comparator blocks 70, 72, and 74. That is, when the difference is less than the program value in the output of the respective comparator block 98 or 100 will be a logic 1 level. The output of the comparator blocks 98 and 100 are passed through the latch circuits 108 and 111 and then through the inverters 109 and 113 respectively to form the almost empty flag signal on terminal 34 and the empty flag signal on terminal 30.

In the preferred embodiment, the program values are the following:

| Program Value Bus | Program Value |
|---|---|
| PE | 1 |
| PAE | 8 |
| PHF | 1025 |
| PAF | 2041 |
| PF | 2048 |

With these program values, the flag signals on the output terminals 28-36 will have the following logic levels:

| Difference on Bus 68 or 96 | EF(30) | AEF(34) | HFF(36) | AFF(32) | FF(28) |
|---|---|---|---|---|---|
| 0 | 1 | 1 | 0 | 0 | 0 |
| 1 | 0 | 1 | 0 | 0 | 0 |
| 2-7 | 0 | 1 | 0 | 0 | 0 |
| 8 | 0 | 0 | 0 | 0 | 0 |
| 9-1024 | 0 | 0 | 0 | 0 | 0 |
| 1025 | 0 | 0 | 1 | 0 | 0 |
| 1026-2040 | 0 | 0 | 1 | 0 | 0 |
| 2041 | 0 | 0 | 1 | 1 | 0 |
| 2042-2047 | 0 | 0 | 1 | 1 | 0 |
| 2048 | 0 | 0 | 1 | 1 | 1 |

The deglitch circuits 94 and 114, described in detail below, operate to separate or isolate the output flag signals 28, 30, 32, 34, and 36 from the outputs of the comparator blocks 70, 72, 74, 98, and 100 during the time that false signals may appear on these outputs.

More specifically, the deglitch circuit 94 provides a one shot pulse to the clock inputs of the latches 84, 88, and 92 upon detecting the leading edge of a write clock pulse or the trailing edge of a read clock pulse. The width of the one shot pulse is enough to compensate for the delay through the write counter block 40 and read counter block 42, the subtractor block 58, and the comparator blocks 70, 72, and 74. The deglitch circuit 114 operates in a similar manner by providing a one shot pulse to the latches 108 and 111 upon the detection of a rising edge of the read clock pulse or the trailing edge of the write clock pulse. The latch circuits 84, 88, 92, 108, and 111 pass the data from their input to their output continuously during the time that the output signal from the deglitch circuits 94 and 114 are at a logic 0 level and isolate the outputs from the inputs during the time that the output signals from the respective deglitch circuits are at a logic 1 level, i.e., when the one shot pulse is present.

Figure 3:
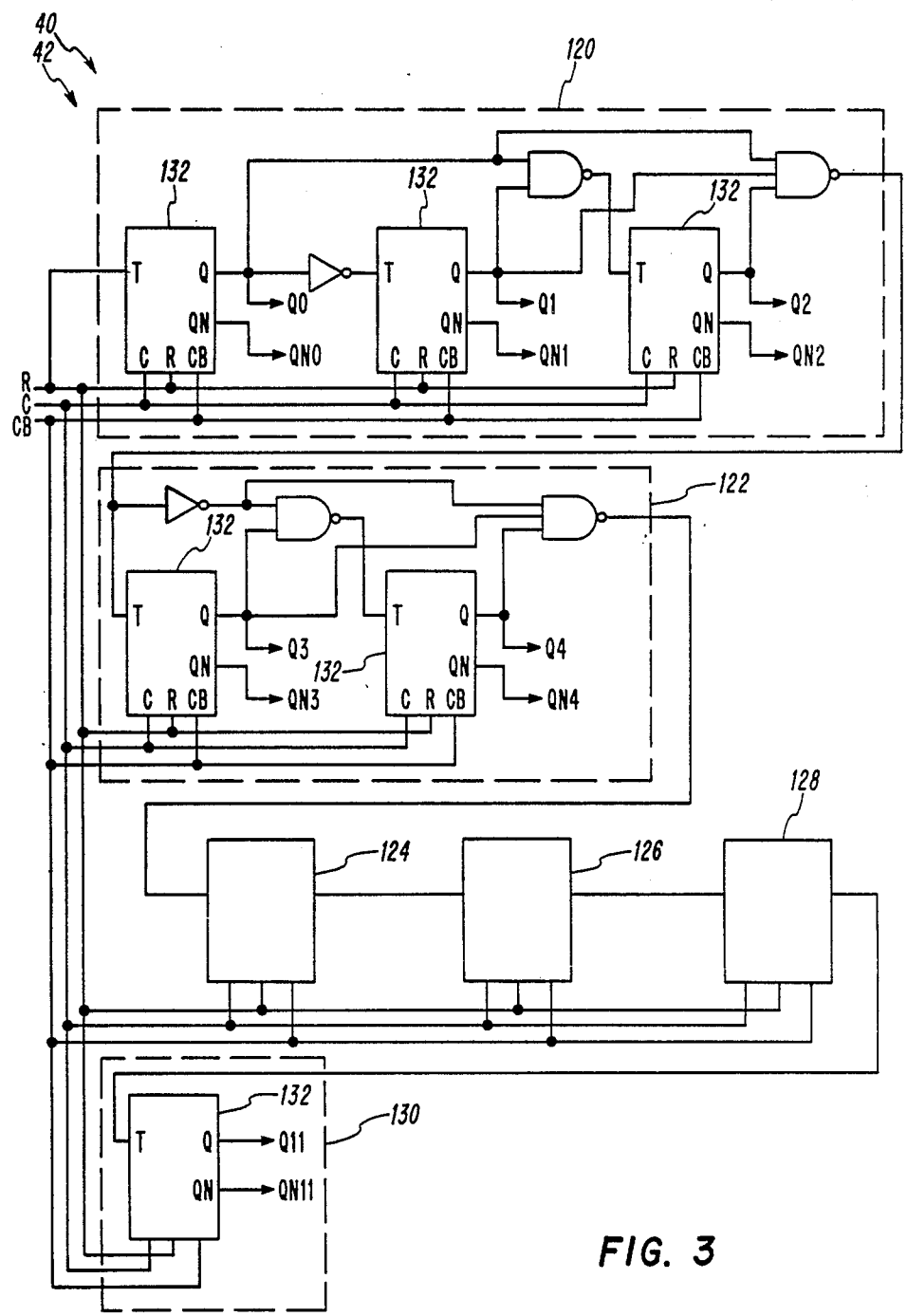
FIG. 3 is a logic diagram of a counter block shown in FIG. 2.

FIG. 3 is a logic diagram of the write counter block 40 and the read counter block 42. The counter blocks 40 and 42 are 12 stage counters which, for purposes of analysis, are divided into 6 sections: the first section 120 consisting of three stages; the second, third, fourth, and fifth sections, shown as element numbers 122, 124, 126, and 128, are identical and each contain two stages; and the last section 130 containing a single stage. Each stage of the counter blocks 40 and 42, as shown in FIG. 3, uses a T flip-flop 132, and the stages are interconnected in a manner which will be easily understood by those skilled in the art. The counter blocks 40 and 42 have the advantage of using only two and three input NAND gates for coupling between the stages.

Figure 4:
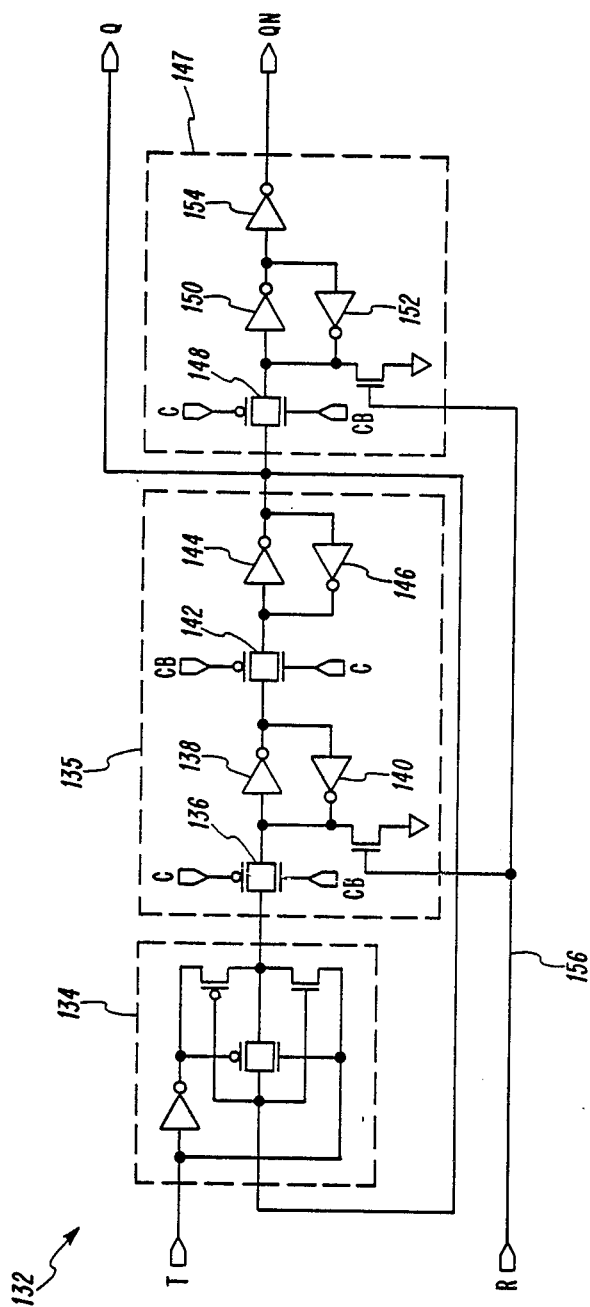
FIG. 4 is a logic diagram of a T flip-flop shown in FIG. 3.

The logic diagram of the T flip-flops 132 used in the counter blocks 40 and 42 is shown in FIG. 4. The Q and QN outputs of the T flip-flop 132 toggles upon the receipt of a clock pulse if the T input is a logic 0 level and does not toggle if the T input is a logic 1 level. Advantageously, the Q output toggles on the leading edge of the clock pulse which, in the preferred embodiment, is when the clock or C input is rising and the clock bar or CB input is falling, while the QN output changes on the trailing edge of the clock pulse which, in the preferred embodiment, is when the C input is falling and the CB input is rising. As shown in FIG. 4, the T input is combined with the Q output of the T flip-flop 132 in an exclusive NOR gate 134. The output of the exclusive NOR gate 134 is connected to the D input of a D flip-flop 135 consisting of a first transmission gate 136 followed by two back to back inverters 138 and 140 followed by a second transmission gate 142 followed by another pair of back to back inverters 144 and 146. The output of the inverter 144 then forms the Q output of the T flip-flop 132. The exclusive NOR gate 134 and the D flip-flop 135 operate in a conventional manner and are known in the art. Connected to the output of the D flip-flop 135 is a latch stage 147 which includes another transmission gate 148 followed by two back to back inverters 150 and 152. The output from the inverter 150 is inverted by an inverter 154 to form the QN output.

As shown in FIG. 4, since the transmission gate 142 is conductive when the clock input is logic 1 level and the clock bar input is a logic 0 level, the Q output changes on the rising edge of the clock signal. In contradistinction, however, the transmission gate 148 is conductive when the clock input is a logic 0 level and the clock bar input is a logic 1 level, and therefore, the QN output changes on the trailing edge of the clock signal. The reset input on line 156, when it is a logic 1 level, forces both the Q and QN outputs to a logic 0 level (provided that the clock input rises to a logic 1 level and the clock bar input is a logic 0 level during the time that the reset input is a logic 1 level).

A logic diagram of a subtractor circuit 160 which forms each stage of the subtractor blocks 58 and 62 is shown in FIG. 5. The subtractor circuit 160 subtracts the Ri input from the Wi input and combines this result with the borrow signal input shown as Bi-1, and provides the difference output Di, the inverse of the difference output DBi, and a borrow output signal Bi. The Ri and Wi inputs are combined in an exclusive OR gate 162, the output of which controls a transmission gate 164 which either passes the borrow input Bi-1 from the previous stage to the borrow output and to the next stage or isolates the Bi-1 input from the next stage. A high impedance driver circuit 166 receives the Ri input and the inverse of the Wi input to drive the Bi signal when the transmission gate 164 is nonconductive, and to provide a high impedance state when the transmission gate 164 is conductive. Thus, when the Ri and Wi inputs are the same logic level, then the transmission gate 164 is conductive and Bi-1 is transferred to borrow output Bi and the output of the high impedance drive circuit 166 is in the high impedance state. When the Ri and Wi are not at the same logic level, then the transmission gate 164 is nonconductive and the output of the high impedance driver state 166 will be a logic 1 level if Ri is logic 1 level and Wi is a logic 0 level, and conversely, will be a logic 0 level if Wi is a logic 1 level and Ri is a logic 0 level. The output of the exclusive OR gate 162 is passed through one of the transmission gates 168 and 170, which are controlled by the borrow input Bi-1 signal, to form the Di output and DBi outputs.

FIG. 6 is a logic diagram of a comparator circuit 172 which forms one stage of the comparator blocks 70, 72, 74, 98, and 100. The comparator circuit 172 consists of two transmission gates 174 and 176. One of two inputs Gi-1 or Pi are transmitted to the output Gi depending on the conductive state of the two transmission gates 174 and 176. The conduction of the transmission gates 174 and 176 is controlled by two additional input signals Xi and XBi. When Xi is a logic 0 level and XBi is a logic 1 level, then the Gi-1 input is passed to the Gi output and the Pi input is isolated from the Gi output. Conversely, when the Xi input is a logic 1 level and the XBi input is a logic 0 level, then the Pi input is passed to the Gi output and the Gi-1 input is isolated from the Gi output.

Figure 7A:
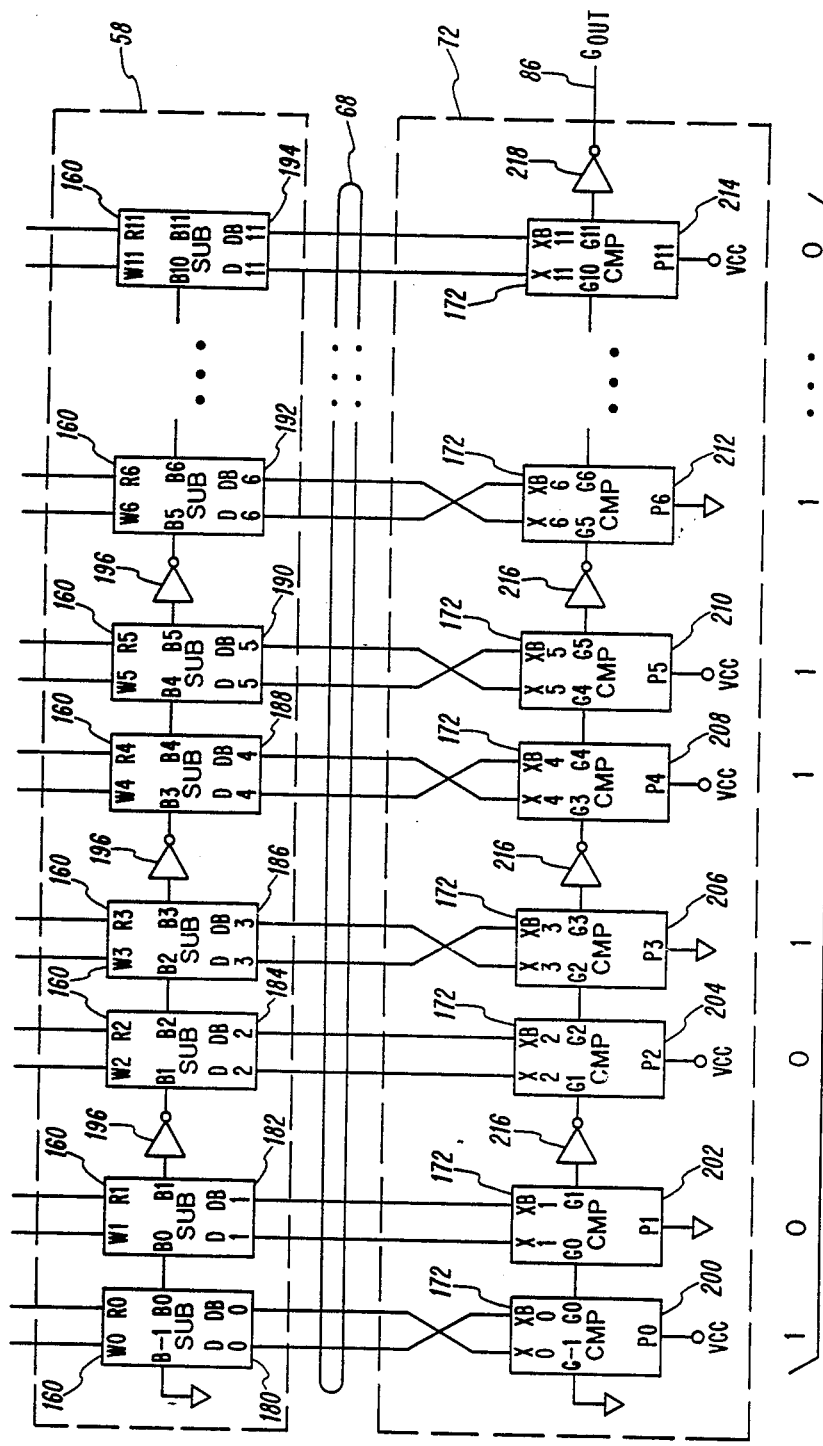
FIG. 7A is a block diagram of a subtractor block and comparator block shown in FIG. 2 and which is a comparator circuit according to the present invention.

Turning now to FIG. 7A, the subtractor block 58 and the almost full comparator block 72 are shown in more detail. The subtractor block 58 consists of 12 subtractor circuits 160. Each of the subtractor circuits 160 has a Wi input from the corresponding data line on the WQ bus 56 and a Ri input from the corresponding data line on the RQN data bus 66. In FIG. 7A the subtractor circuit 160 which generates the least significant bit of the difference is shown on the left hand side of the drawing as element number 180, with the next least significant bit generated by the next subtractor circuit 182, with the subtractor circuits for the next more significant bits shown as element number 184, 186, 188, 190, 192, and element number 194 designating the subtractor circuit 160 for the most significant bit of the subtractor block 58. The borrow chain runs horizontal through FIG. 7A with the borrow input of the subtractor circuit 180 connected to ground, and the borrow output connected to the borrow input of the subtractor circuit 182. The borrow output of the subtractor circuit 182 is connected to the input of an inverter 196, the output of which is connected to the borrow input of the subtractor circuit 184. In a similar manner, an inverter is connected to the borrow chain between every other subtractor circuit 160 and the next subtractor circuit 160 in the chain. The inverters 196 are required because the borrow input is transferred to the borrow output in the subtractor circuits 160 through only a transmission gate, and thus, the inverters 196 are required to amplify the borrow signal through the subtractor block 58.

The effect of the inverters 196 is to cause the borrow signal to be inverted in every other set of two subtractor circuits 160 in the subtractor block 58. Thus, in FIG. 7A, the subtractor circuits 184, 186, 192, and 194 have inverted borrow chains. The subtractor circuits 160 which have inverted borrow chains will be referred to herein as negative logic portions of the subtractor block 58. The other subtractor circuits 160, for example subtractor circuits 180, 182, 188, and 190 shown in FIG. 7A, which do not have the borrow chain inverted will be referred to herein as positive logic portions of the subtractor block 58. The effect of the negative logic portion is compensated for in a manner described below.

The output of the subtractor block 58 on bus 68 is connected to the input of three comparator circuits 70, 72, and 74 as described above with reference to FIG. 2. A logic diagram of the almost full comparator block 72 is shown in FIG. 7A. The comparator block 72 includes 12 comparator circuits 172. The comparator circuit 172 for comparing the least significant bit is shown on the left hand side and designated as element 200 in FIG. 7A. The comparator circuits 172 for the next succeeding significant bits are comparator circuits 202, 204, 206, 208, 210, 212, and the comparator circuit 214 compares the most significant bit in the compare block 72.

The comparator circuit 200 has its Gi-1 input, shown as G-1 in FIG. 7A, connected to ground. Its Gi output, shown as G0, is connected to the Gi-1 input of comparator circuit 202. The Gi output, shown as G1, of comparator circuit 202 is connected to the input of an inverter 216, the output of which is connected to the Gi-1 input, shown as G1, of the comparator circuit 204. In a similar manner, inverters 216 are connected between the Gi outputs of every second comparator circuit 172 and the G-1 inputs of the next comparator circuit 172 in the comparator chain to amplify and invert the signal path between every other comparator circuit 172 and its next succeeding circuit. The inverters 216, like the inverters 196, operate to amplify the signal between the comparator circuits 172 since the comparator circuits 172 consist only of transmission gates without amplification.

The effect of the inverters 216 is to cause the compare signal Gi through the comparator block 72 to be inverted in every other set of two comparator circuits 172. Thus, in FIG. 7A, the comparator circuits 204, 206, 212, and 214 have inverted compare signals Gi. The comparator circuits 172 which have inverted compare signals of Gi will be referred to herein as negative logic portions of the comparator block 72. The other comparator circuits 172, for example comparator circuits 200, 202, 208, and 210 shown in FIG. 7A, which do not have their compare signal Gi inverted will be referred to herein as positive logic portions of the comparator block 72. The bit positions of the negative and positive logic portions of the subtractor block 58 corresponds to the bit positions of the negative and positive logic portions of the comparator block 72. The effect of the negative logic portion of the comparator block 72 is compensated for in a manner described below. A final inverter 218 is connected to the Gi output, shown as G11, of the comparator circuit 214 to form the output signal on line 86.

On the bottom of FIG. 7A are the individual bits for the program value for the almost full flag with the most significant bit at the right and the least significant bits at the left in FIG. 7A. The program value for the almost full register 72 is 2,041, which, in binary format, means that the most significant bit and the second and third least significant bit are binary 0s with the remaining bits being binary 1s. The algorithm for the connection between the individual subtractor circuits 160 and the individual comparator circuits 172 is to connect the Di output from the subtractor circuit 160 to the Xi input of the comparator circuit 172 and to connect the DBi output from the subtractor circuit 160 to the XBi input of the comparator circuit 172 if the program value for the particular bit is a binary 0; and if the program value is a binary 1, to connect the Di output of the subtractor circuit 160 to the XBi input of the comparator circuit 172 and to connect the DBi output of the subtractor circuit 160 to the Xi input of the comparator 172. These connections are advantageously made in the preferred embodiment in the metal layer to facilitate programming of the program value.

The algorithm for the connection of the Pi inputs to the comparator circuits 172 is to connect VCC to Pi if the program value is logic 1 and the comparator circuit 172 is in the positive logic portion of the comparator block 72, and to ground the Pi input if the program value is a 0. If the comparator circuit 172 is in the negative logic portion of the comparator block 72, the Pi input is connected to ground for a program value of binary 1, and is connected to VCC for a program value of binary 0. In this manner, the effect of the negative logic portions of the subtractor block 58 and the comparator block 72 are compensated for.

The operation of the comparator block 72 and subtractor block 58 as shown in FIG. 7A can be understood by starting with the GOUT signal on line 86. The GOUT signal on line 86 will be a logic 1 level if the program value is greater than the difference from the subtractor block 58. If the program value is equal to or less than the difference, then GOUT on line 86 will be a logic 0 level. Consider the case immediately following the reset of the FIFO memory 10. Under this condition the output of the subtractor block 58 will be a logic 0 level, i.e., the Di outputs of the subtractor circuits 160 will be a logic 0 level and the DBi outputs will be a logic 1 level. Working back from the GOUT signal on line 86, the output of the comparator circuit 214 will be the same as the G10 input to the comparator circuit 214 since the comparator will pass its Gi-1 input to its Gi output. The G10 output from the previous stage will be provided by a comparator which will be configured the same as the comparator circuit 212. Since the difference inputs from the subtractor circuit 160 providing the X10 and X10B inputs to the comparator are interchanged (thereby inverting the outputs from subtractor circuit 110) because the programmed value for bit 10 is a logic 1, the G10 output from the comparator 172 for the second most significant bit will be the same as its P10 input which, because the programmed value is a logic 1 and the comparator is operating in a negative logic portion will be ground. Thus, the output of this comparator, G10, will be a logic 0 level which will be passed by the comparator circuit 214 to the input of the inverter 218 which will be inverted to place a logic 1 level on the GOUT line 86.

The GOUT line 86 will remain a logic 1 level for all differences out of the subtractor block 58 which are less than the program value. For each of these values, at least one of the comparator circuits 172 other than comparator circuits 202, 204, and 214 will have its Pi input connected to its Gi output to cause the GOUT signal on line 86 to be a logic 1 level.

When the difference out of the subtractor block 58 equals the program value then each of the comparator circuits 172 will have signals on their Xi and XBi inputs such that the Gi-1 inputs will be passed to the Gi outputs and the ground connected to the G-1 input of the comparator circuit 200 will be passed through the comparator chain after the inversions by the inverters 216 and the inverter 218 to place a logic 0 signal on line 86. The number of inverters 216 plus the inverter 218 forms an even number; thus, the ground input at the comparator circuit 172 forms a logic 0 at the line 86.

When the difference out of the subtractor block 58 is 1 greater than the program value, then the comparator circuit 202 will place the ground input on the P1 input onto the G1 output and the state of the comparator circuit 200 will be ignored. Thus, the GOUT signal on line 86 will remain a logic 0. For all other greater difference values out of the subtractor block 58, either the comparator circuit 202, 204, or 214 will place its Pi input onto its Gi output, and the GOUT signal on line 86 will be a logic 0 level.

Figure 7B:
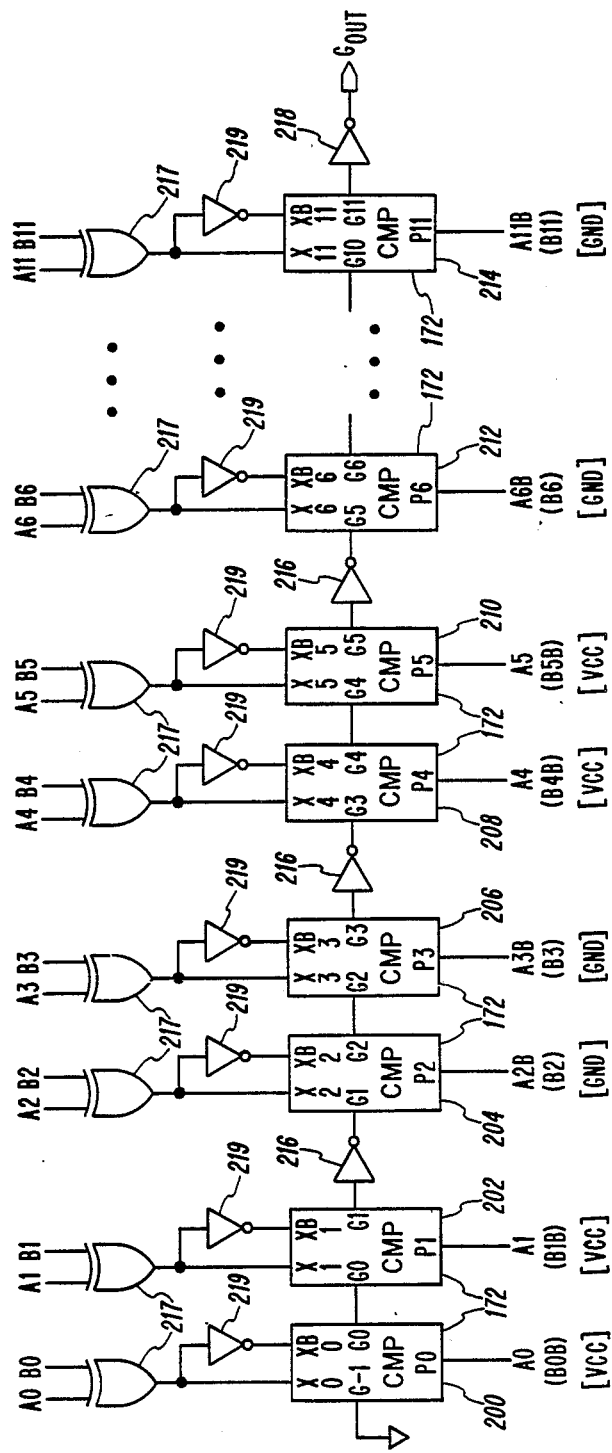
FIG. 7B is a block diagram of an alternative embodiment of a comparator block according to the present invention.

The comparator block 72 can also be used to compare two digital data sets with circuitry shown in FIG. 7B. As shown in FIG. 7B, two data sets, an A data set and a B data set, are both twelve bits in length and corresponding data bits are combined in twelve exclusive OR gates 217, the outputs of which form the Xi inputs to the comparator circuits 172. The outputs of the exclusive OR gates 217 are inverted by inverters 219 to form the XBi inputs to the comparators 172. The Pi inputs to the comparator circuits 172 are connected to the A data set bits for the positive logic portion of the comparator block 72 made up of the comparators 200, 202, 208, and 210 shown in FIG. 7B while the inverse of the A data set bits from the Pi inputs of the comparator circuits 172 for the comparator circuits 204, 206, 212, and 214 in FIG. 7B which are the negative logic portions of the comparator block 72. Alternatively, the B data set bits can be substituted for the corresponding A bar data set bits as shown in parenthesis in FIG. 7B. Also, the B bar data set bits can be substituted for the corresponding A data set bits as shown in FIG. 7B.

More significantly, the least significant data bit of the data sets A and B, shown as A0 and B0 in FIG. 7B are combined in one of the exclusive OR gates 217, the output of which is inverted by one of the inverters 219 to form the X0 and XB0 inputs respectively of the comparator circuit 200. The Gi-1 input of the comparator circuit 200 is connected to ground and the P0 input of the comparator circuit 200 is connected to the data bit A0. In the same manner, the second least significant bits A1 and B1 are exclusive ORed together and inverted to form the X1 and XB1 inputs of the comparator circuit 202, the P1 input being the data signal A1. The A2 and B2 inputs are combined in an exclusive OR gate 217, the output of which is inverted by the inverter 219 to form the X2 and XB2 inputs of the comparator circuit 204, the P2 input formed by the inverse of the A2 data set shown as A2B in FIG. 7B. Similarly, the rest of the A data set bits and B data set bits are combined as shown in FIG. 7B with A11 and B11 being the most significant bits of the data sets A and B.

The operation of the comparator circuit shown in FIG. 7B is essentially the same as the comparator circuit shown in FIG. 7A in that when the data sets A and B are equal to each other, then the G-1 input of the comparator circuit 200 is passed through the comparator chain to the output of the inverter 218 to form the GOUT signal. However, when the data set A is different from the data set B, the the most significant bits of the two data sets which are not equal to each other will cause a respective comparator circuit 172 to couple its Gi output to its Pi input which, in the embodiment shown in FIG. 7B, is the bit from the A data set. Thus, if the two data sets are not equal, then the most significant bit of the A data set which is different from the B data set will indicate if the A data set is greater (the A data bit equal to a logic 1) or less than (the A data bit equal to a logic 0) the B data set. In the negative logic portions, the Pi input is the inverse of the A data set bit since the path from that particular comparator to the output of the inverter 218 is through an odd number of inverter stages. If it is desired that the equaled condition be a logic 1, then the G-1 input of the comparator circuit 200 would be connected to VCC rather than the ground. Under these conditions the GOUT line 86 will be a logic 1 level if the A data set is greater than or equal to the B data set. Correspondingly, the input to the inverter 218 will be a logic 1 level when the B data set is greater than the A data set. Therefore, by selecting the G-1 input as a logic 1 level or a logic 0 level, and by selecting as an output to the comparator circuit the input or output of the inverter 218, the output of the comparator circuit can indicate if the A data set is greater than, greater than or equal to, less than, or less than or equal to the B data set. Also, two comparator blocks with two different G-1 inputs can be combined by ANDing their respective outputs to provide an output which is a logic 1 level only when the A data set is equal to the B data set.

Also, the comparator circuit as shown in FIG. 7B can be used to indicate if the A data set is equal to the B data set. For the comparator circuit shown in FIG. 7B to detect if the A data bus and the B data bus are equal, the Pi inputs of the comparator circuits 172 are connected to VCC for comparator circuits 172 in the positive logic portion of the comparator block 72, such as comparator circuits 200, 202, 208, and 210 in FIG. 7B; and are connected to ground for comparator circuits 172 in the negative logic portions of the comparator block 72, such as comparator circuits 204, 206, 212, and 214 in FIG. 7B. These connections are shown in brackets at the bottom of FIG. 7B. In operation, when the A data set is equal to the B data set, the G-1 input will be passed to GOUT on line 218 forcing it to a logic 0 level. If any bit of the A data set is not equal to the corresponding bit on the B data set, then one of Pi inputs will be passed to the GOUT line 218 forcing it to a logic 1 level.

Figure 8:
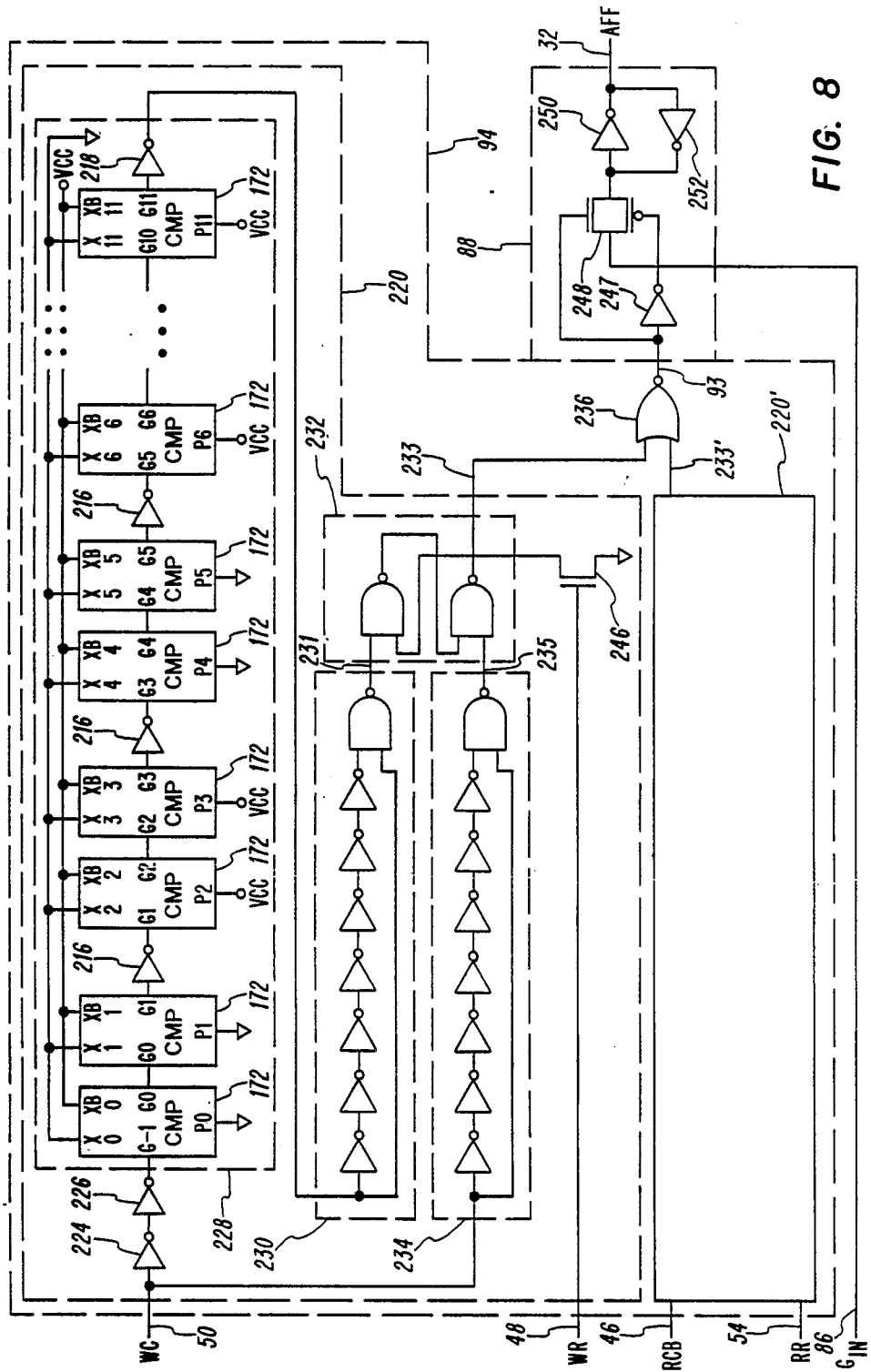
FIG. 8 is a logic diagram of a deglitching circuit and latch shown in FIG. 2.

Turning now to FIG. 8, a logic diagram of the deglitch circuit 94 and the latch circuit 88 is shown. The deglitch circuit 114 and the latch circuits 84, 92, 108, and 111 have the same schematic as the deglitch circuit 94 and the latch circuit 88 shown in FIG. 8. The WC clock signal on line 50 is connected to the input of a blanking circuit 220. The clock input on line 50 of the blanking circuit 220 is connected to the input of a first inverter 224, the output of which is connected to the input of a second inverter 226. The output of the inverter 226 is connected to the G-1 input of a first comparator circuit 172 in a comparator block 228. The comparator block 228 is the same circuitry as the comparator blocks 70, 72, 74, 98, and 100 with the Xi inputs of the comparator circuits 172 connected to ground and the XBi inputs connected to VCC. The output of the comparator block 228 is connected to the input of a one shot 230, the output of which on line 231 is connected to one input of an RS flip-flop 232 formed by the cross coupled arrangement of two NAND gates. The clock input on line 50 is also connected to the input of a second one shot 234, the output of which on line 235 is connected to the second input of the RS latch 232. The output of the RS latch 232 on line 233 is connected to one input of a NOR gate 236, the output of which forms the output of the deglitch circuit 94 on line 93 as shown in FIG. 2. This output on line 93 is connected to the clock input of the latch 88. The D input to the latch 88 is on the line 86 shown as GIN in FIG. 8 which is also the GOUT line 86 shown in FIG. 7A. A reset signal WR on line 48 is connected to the gate of an n-channel transistor 246 which operates to pull the output on line 233 of the RS latch 232 to ground during a write reset operation.

The second input to the NOR gate 236 is driven by the output from a second blanking circuit 220'. The blanking circuit 220' is the same circuit as the blanking circuit 220, and has connected to its clock input the RCB signal on line 46, and connected to its reset input is the RR signal on line 54.

The clock input of the latch 88 is connected to the input of an inverter 247 and to the n-channel gate of a transmission gate 248. The output of the inverter 247 is connected to the p-channel gate of the transmission gate 248. The D input of the latch 88 which, in FIG. 8, is the GIN signal on line 86 is passed through the transmission gate 248 and to the input of an inverter 250, the output of which forms the almost full flag signal, AFF, on line 32. Another inverter 252 has its input connected to the output of the inverter 250 and its output connected to the input of the inverter 250 to form the latch portion of the latch 88. Although for simplicity a single clock signal on line 93 from the output of the NOR gate 236 to the clock input of the latch circuits 88 is shown in FIG. 2 and FIG. 8, it will be understood that in the preferred embodiment the inverter 247 is part of the deglitch circuit 94 and two clock lines consisting of the output of the NOR gate 236 and the inverter 247 is routed to each of the latches 88.

The operation of the deglitch circuit 94 shown in FIG. 8 will now be described with reference to FIG. 9. During the time that the FIFO memory 10 is not receiving a read clock or a write clock, the output of the NOR gate 236 is a logic 1 level, transmission gate 248 is conductive, and the GIN signal on line 86 is passed through the inverter 250 to the AFF signal output on terminal 32. Upon receipt of the rising edge of the write clock signal on line 50, the one shot 234 produces a pulse at its output on line 235 as shown in FIG. 9. This output pulse on line 235 sets the RS latch 232 output on line 233 to a logic 1 level, also shown in FIG. 9. This logic 1 level at node 233 causes the transmission gate 248 to be nonconductive; therefore, any changes on the GIN line 86 are ignored with the inverters 250 and 252 preserving the previous state of the AFF signal until the transmission gate 248 is again enabled. The rising edge of the write clock signal on line 50 is passed through the inverters 224 and 226 which compensates for the delay through the write counter block 40. It will be understood that additional pairs of inverters may be put in series with the inverters 224 and 226 if required to compensate for the delay through the write counter block 40. The output from the inverter 226 is fed through the comparator chain 228 to match the delay through the subtractor block 58 and the comparator blocks 70, 72, and 74. Advantageously, the data flow through both the subtractor block 58 and the comparator blocks 70, 72, and 74 is in parallel moving from the left to the right in FIG. 7A and, therefore, the delays are not cumulative, but rather consecutive. The rising edge of the output from the comparator block 228 fires the one shot 230 to produce a pulse at its output node 231 which resets the RS latch 232 as shown in FIG. 9. Thus, at the time the RS latch 232 is reset, the transmission gate 248 is again enabled if the transmission gate 248 is not being simultaneously disabled by the operation of the deglitch circuit 220'.

The operation of the blanking circuit 220' is the same as the operation just described for the blanking circuit 220.

Also shown in FIG. 9 is one of the bits, bit 0 for example, from bus 56 which is the WQ output from the write counter 40. As shown in FIG. 9, the data bit on bus 56 changes at the rising edge of the write clock pulse. In contradistinction, one of the bits, for example bit 0, on bus 66 which is the RQN output from the read counter 42 changes on the trailing edge of the read clock bar signal as shown in FIG. 9. The one shots 230' and 234' (like the one shots 230 and 234) ignore the falling edge pulses at their input which is the leading edge of the read clock bar signal, and thus, the state of the RS latch 232' does not change until the trailing edge of the read clock bar signal is detected. Upon this rising edge on the trailing edge of the read clock bar signal, the one shot 234' sets the RS latch 232' to make nonconductive the transmission gate 248, and the delayed trailing edge of the read clock bar signal then fires the one shot 230' to reset the RS latch 232' to again make conductive the transmission gate 248 assuming that the blanking circuit 220 is not at the same time keeping the transmission gate 248 from being conductive. The outputs from the one shot 230' on line 231' and the one shot 234' on line 235' and the output from the RS latch 232' on line 233' are also shown in FIG. 9.

The flag generation circuit 12 described above provides an output signal indicative of the time delay between two asynchronous clock signals. This indication is produced by comparing the relative difference between the two asynchronous pointers and a preset value. This circuitry allows for generation of multiple status flags using the same basic circuitry. Also, only one set of counters is necessary to accommodate the various flags.

Moreover, the matching of the propagation delay through the subtractor blocks 58 and 62 with the propagation delay through the comparator blocks 70, 72, 74, 98, and 100 and the parallel operation through these blocks as opposed to serial operation of two blocks, allows for fast clock cycle times. The propagation delays are matched since the signal path for the borrow chain in the subtractor blocks 58 and 62 is matched to the signal path for the comparator blocks 70, 72, 74, 98, and 100. These signal paths consist of an equal number of transmission gates and inverters.

Moreover, the flags generated by the above circuitry are free of catastrophic arbitration problems because the generation of the flag is dependent on a continuous signal based on the current state of the counters and not an instantaneous event such as sampling of the status of two counters after a read pulse or a write pulse as is done in some prior art circuits. Moreover, the program values are easily programmed in metal-1 or metal-2 allowing for easy modification of the these program values.

The comparator block 172, and the comparator circuit shown in FIG. 7B, provide a comparator circuit which utilizes a minimum amount of chip area and which requires a minimum amount of power supply current.

As a further advantage, the T flip-flop 132 provides both the Q and QN signals with a minimum amount of circuitry, thereby providing data with changes on the leading edge and the trailing edge of the clock pulse.

Although the invention has been described in part by making detailed reference to a certain specific embodiment, such detail is intended to be, and will be understood to be, instructional rather than restrictive. It will be appreciated by those skilled in the art that many variations may be made in the structure and mode of operation without departing from the spirit and scope of the invention as disclosed in the teachings contained herein. For example, the program values may be made programmable on the chip to allow greater versatility in the selection of flag signals generated by the FIFO memory 10.

Also, while in the preferred embodiment the inverters 196 in the subtractor block 58 and the inverters 216 in the comparator block 72 are inserted between sets of two subtractor circuits 160 and comparator circuits 172, it will be appreciated that number of inverters used may be different (i.e. more or fewer subtractor circuits or comparator circuits between successive inverters) in order to optimize speed through the respective block. This optimum speed may have to be compromised, though, for space limitations on the I.C. chip.

What is claimed is:

1. Circuitry for detecting if the difference between two numbers represented as logic levels on first and second data busses is less than or greater than a preset value comprising:
   (a) a subtractor chain having a plurality of subtractor circuits in series with a first subtractor circuit at one end of said subtractor chain and an Nth subtractor circuit at the other end of said subtractor chain, each of said subtractor circuits comprising:
      (i) a difference output terminal and a borrow output terminal;
      (ii) first and second input terminals coupled to one signal line each of said first and second data busses respectively and a borrow input terminal, said borrow input terminal coupled to a first reference voltage in said first subtractor circuit and the borrow input terminals of the rest of said subtractor circuits being coupled to the borrow output terminal of the preceding subtractor circuit in said subtractor chain;
      (iii) circuitry which determines the arithmetic difference between the number on said first bus and the number on said second bus combined with said borrow input signal and which produces said difference output signal and said borrow output signal;
   (b) a comparator chain having a plurality of comparator circuits, corresponding to said subtractor circuits, in series with a first comparator circuit at one end of said comparator chain and an Nth comparator circuit at the other end of said comparator chain, each of said comparator circuits comprising:
      (i) an output terminal;
      (ii) a preset bit input coupled to one bit of said preset value, a difference input coupled to the difference output of a corresponding subtractor circuit of said subtractor chain, and a compare input, said compare input coupled to a second reference voltage in said first comparator circuit, and the compare inputs of the remainder of said comparator circuits being coupled to the output terminal of the previous comparator circuit;
      (iii) switch circuitry which couples said preset value input to said output terminal when said difference input is at a first logic state and which couples said compare input to said output terminal when said difference input is at a second logic state; and
      (iv) wherein said output terminal of said Nth comparator circuit forms an output indicative of whether the difference between said two numbers on said first and second data busses is greater than said preset value.

2. Circuitry set forth in claim 1 wherein said first and second reference voltages are the same voltage potential.

3. Circuitry set forth in claim 1 wherein said borrow output terminal of at least one of said subtractor circuits is coupled to said borrow input terminal of the next succeeding subtractor circuit through an inverter, and said output terminal of at least one of said comparator circuits is coupled to said compare input of the next succeeding comparator circuit through an inverter.

4. Circuitry as set forth in claim 1 wherein said difference output terminal of at least one of said subtractor circuits is inverted when coupled to said difference input terminal of the corresponding comparator circuit.

5. Circuitry for detecting if the number on a first data set, A, is greater than the number on a second data set, B, both of N bits in length, comprising:
   (a) an N plurality of exclusive OR gates, each of said exclusive OR gates having as inputs a data bit from said A data set and a corresponding data bit from said B data set and having an exclusive OR output;
   (b) a comparator chain having N comparator circuits in series with a first comparator circuit at one end of said comparator chain and an Nth comparator circuit at the other end of said comparator chain, each of said comparator circuits comprising:
      (i) an output terminal;
      (ii) a first input coupled to one of the bits of said A data set, a second input coupled to one of said exclusive OR outputs, and a compare input, said compare input coupled to a reference voltage in said first commparator circuit, and the compare inputs of the remainder of said comparator circuits being coupled to the output terminal of the previous comparator circuit;
      (iii) switch circuitry which couples said first input to said output terminal when said second input is at a first logic state and which couples said compare input to said output terminal when said second input is at a second logic state; and (iv) wherein said output terminal of said Nth comparator circuit forms an output indicative of whether the A data set is greater than the B data set.

6. Method for detecting if a first data set, A, is greater than a second data set, B, both data sets being of N bits in length, comprising the steps of:

(a) exclusively ORing together each of the corresponding data bits of the A data set and the B data set; and (b) coupling a first input terminal of each of N comparator circuits to an output terminal of the comparator circuits when the output of a corresponding exclusive OR gate is a first logic state, and coupling a second input terminal of each of said comparator circuits to the output terminal when the output of said corresponding exclusive OR gate is a second logic state, said N comparator circuits formed in a series arrangement with a first comparator circuit having its first input terminal connected to a reference voltage and the input terminals of the rest of said comparator circuits connected to the output terminal of the previous comparator circuit in the chain, the output terminal of the Nth comparator circuit forming a signal indicative of whether the number on the A data bus is greater than the number on the B data bus.

7. Circuitry for detecting if the number on a first data set, A, is equal to the number on a second data set, B, both of N bits in length, comprising:

(a) an N plurality of exclusive OR gates, each of said exclusive OR gates having as inputs a data bit from said A data set and a corresponding data bit from said B data set and having an exclusive OR output;

(b) a comparator chain having N comparator circuits in series with a first comparator circuit at one end of said comparator chain and an Nth comparator circuit at the other end of said comparator chain, each of said comparator circuits comprising:

(i) an output terminal;

(ii) a first input coupled to a first logic level voltage, a second input coupled to one of said exclusive OR outputs, and a compare input, said compare input coupled to a second logic level voltage in said first comparator circuit, and the compare inputs of the remainder of said comparator circuits being coupled to the output terminal of the previous comparator circuit;

(iii) switch circuitry which couples said first input to said output terminal when said second input is at a first logic state and which couples said compare input to said output terminal when said second input is at a second logic state; and (iv) wherein said output terminal of said Nth comparator circuit forms an output indicative of whether the A data set is equal to the B data set.

* * * * *